(No Model.)
S. SHAW.
NUT LOCK.
No. 290,712. Patented Dec. 25, 1883.
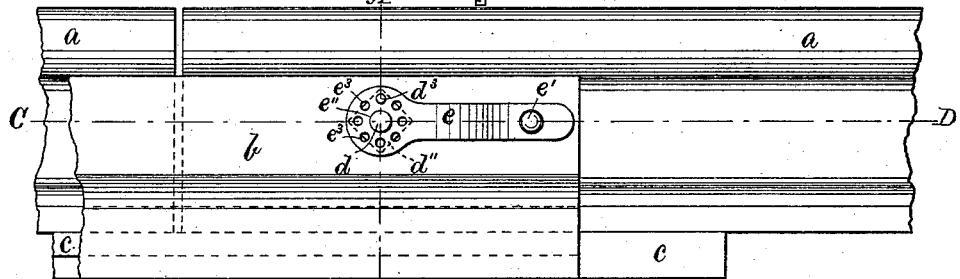
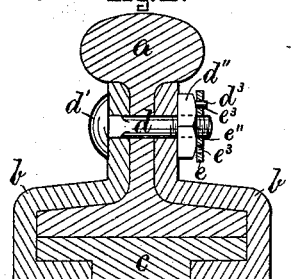
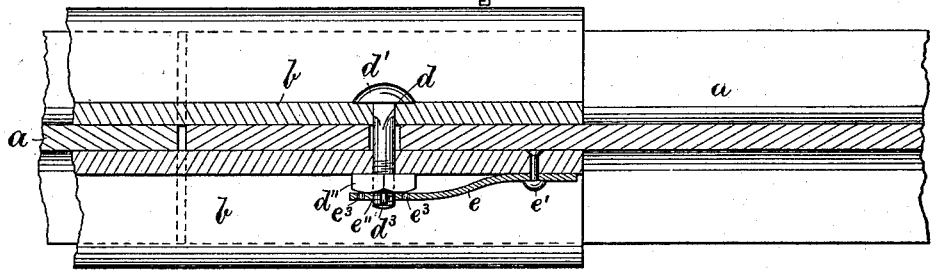
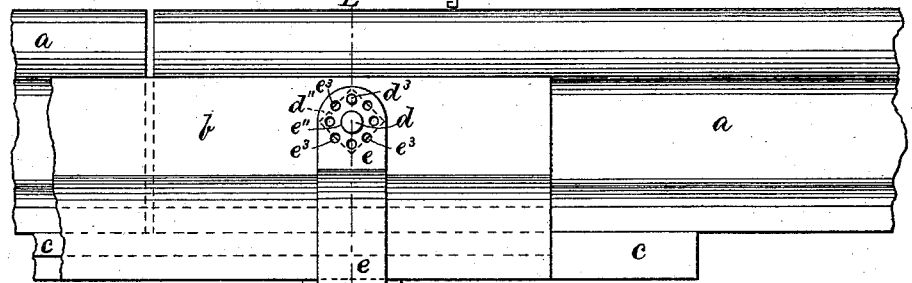
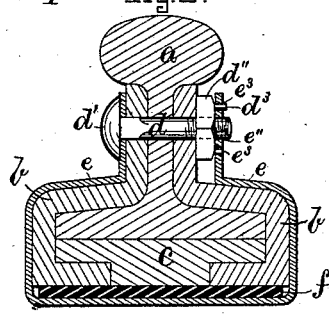
Witnesses
Henry Chadbourn.
F. Allen
Inventor
Sumner Shaw.
by Allan Andrew
his atty

UNITED STATES PATENT OFFICE.

SUMNER SHAW, OF BOSTON, MASSACHUSETTS.

NUT-LOCK.

SPECIFICATION forming part of Letters Patent No. 290,712, dated December 25, 1883.

Application filed May 2, 1883. (No model.)

*To all whom it may concern:*

Be it known that I, SUMNER SHAW, a citizen of the United States, residing at Boston, in the county of Suffolk and State of Massachusetts, have invented certain new and useful Improvements in Nut-Locks; and I do hereby declare that the same are fully described in the following specification and illustrated in the accompanying drawings.

This invention relates to improvements in nut-locks; and it is carried out as follows, reference being had to the accompanying drawings, where—

Figure 1 represents a side elevation of the invention as applied to a railroad-joint. Fig. 2 represents a vertical section on the line A B, shown in Fig. 1; and Fig. 3 represents a horizontal section on the line C D, also shown in Fig. 1. Fig. 4 represents a modification of the improved nut-lock; and Fig. 5 represents a vertical section on the line E F, shown in Fig. 4.

Similar letters refer to similar parts wherever they occur on the different parts of the drawings.

$a$ represents an ordinary railroad-iron, and $b\,b$ represent the fish-plates with the sole-plate $c$ at the junction of two abutting rails.

$d$ represents an ordinary screw-bolt passing through suitable perforations in the fish-plates $b\,b$ and rail $a$, as usual, and is provided in one end with a head, $d'$, and in the other with a nut, $d''$, as shown.

To prevent the nut $d''$ from working loose from its screw-bolt $d$, I secure to one of the fish-plates $b$ a metal spring-plate, $e$, which is riveted at $e'$ to such fish-plate and provided in its free end with a central perforation, $e''$, adapted to receive the end of the screw-bolt $d$ that projects beyond the nut $d''$, as shown in the drawings in Figs. 1, 2, and 3. Besides such central perforation, $e''$, the said spring-plate $e$ is provided with a number of smaller perforations, $e^3\,e^3$, arranged in a circle around the perforation $e''$, as shown. The outside of the nut $d''$ is provided with a pin or projection, $d^3$, which is adapted to project into one of the smaller perforations $e^3$, after the nut $d''$ has been screwed up tightly, and in this manner the loosening of the fastening nut and bolt is entirely obviated. The curvature of the spring-plate $e$ is such that it will automatically be held in its free end against the outer face of the nut, and when turning the nut the said spring-plate $e$ has to be raised by hand or a suitable tool, so as to cause the pin or projection $d^3$ on the nut $d''$ to be disengaged from its locking perforation $e^3$. This is the most preferable device; but in case an elastic packing or cushion, $f$, is used below the sole-plate $c$ and fish-plates $b\,b$, as shown in Figs. 4 and 5, I modify my invention by securing the spring-plate $e$ to the head $d'$ of the fastening-bolt $d$, and bend it to pass down one fish-plate, then under the elastic cushion $f$, and up on the outside of the opposite fish-plate, as shown in Figs. 4 and 5, where its free end is provided with a central perforation, $e''$, adapted to receive the projecting end of the screw-bolt $d$ and locking perforations $e^3\,e^3$, adapted to lock with the pin or projection $d^3$ on the outer face of the nut $d''$, in the same manner as above described in relation to Figs. 1, 2, and 3.

This improved nut-lock is equally well adapted for securing nuts in place on railway-cars or any other objects in which the nuts are liable to get loose by jars, friction, or other causes.

What I wish to secure by Letters Patent, and claim, is—

In combination with the fastening-bolt $d$, its nut $d''$, and pin or projection $d^3$ on the latter, the spring-plate $e$, secured to the stationary part $b$, and having perforation $e''$, adapted to receive the projecting end of the screw-bolt $d$, and perforations $e^3\,e^3$, adapted to lock onto the pin or projection $d^3$ on the nut $d''$, as and for the purpose set forth.

In testimony whereof I have affixed my signature in presence of two witnesses.

SUMNER SHAW.

Witnesses:
ALBAN ANDRÉN,
HENRY CHADBOURN.